(12) United States Patent
Falloon et al.

(10) Patent No.: US 7,008,973 B2
(45) Date of Patent: Mar. 7, 2006

(54) VACUUM COOLED FOAMS

(75) Inventors: Stephen B. Falloon, Lafayette, IN (US); Richard S. Rose, West Lafayette, IN (US); Mathew D. Phillips, Camden, IN (US)

(73) Assignee: PABU Services, Inc., Wilmington, DE (US)

( * ) Notice: Subject to any disclaimer, the term of this patent is extended or adjusted under 35 U.S.C. 154(b) by 0 days.

(21) Appl. No.: 10/757,685

(22) Filed: Jan. 14, 2004

(65) Prior Publication Data

US 2004/0171709 A1 Sep. 2, 2004

Related U.S. Application Data

(60) Provisional application No. 60/439,886, filed on Jan. 14, 2003.

(51) Int. Cl.
*C08G 18/00* (2006.01)

(52) U.S. Cl. .................. 521/106; 521/107; 521/108; 521/123; 521/128; 521/130; 521/170; 521/174

(58) Field of Classification Search ............... 521/106, 521/107, 108, 123, 128, 130, 170, 174
See application file for complete search history.

(56) References Cited

U.S. PATENT DOCUMENTS

| | | | |
|---|---|---|---|
| 3,957,702 A * | 5/1976 | Molotsky et al. ........... 521/168 |
| 4,748,192 A * | 5/1988 | Smith ......................... 521/107 |
| 5,171,756 A | 12/1992 | Ricciardi et al. | |
| 5,194,453 A * | 3/1993 | Jourquin et al. ............ 521/131 |
| 5,637,757 A | 6/1997 | Hill et al. | |
| 5,728,760 A * | 3/1998 | Rose et al. .................. 524/292 |
| 5,958,993 A * | 9/1999 | Blundell et al. ............. 521/168 |
| 6,765,035 B1 * | 7/2004 | Eling et al. ................. 521/174 |

* cited by examiner

*Primary Examiner*—John M. Cooney, Jr.
(74) *Attorney, Agent, or Firm*—Baker & Daniels LLP

(57) ABSTRACT

A flexible, flame-retarded, polyurethane foam comprising brominated and/or phosphorous flame retardants and an acid scavenger.

6 Claims, No Drawings

VACUUM COOLED FOAMS

CROSS REFERENCE TO RELATED APPLICATION

This application claims the benefit under Title 35, U.S.C. § 119(e) of U.S. Provisional Patent Application Ser. No. 60/439,886, entitled VACUUM COOLED FOAMS, filed on Jan. 14, 2003.

BACKGROUND OF THE INVENTION

1. Field of the Invention

The present invention relates generally to novel flame-retarded, flexible polyurethane foams.

2. Description of the Prior Art

The flexible polyurethane foams that are a part of the invention are well known in the industry. Information on preparation and common reactants can be found in many resources, including the Encyclopedia of Polymer Science and Engineering, Vol. 13, copyright 1988, John Wiley & Sons, Inc.

Polyurethane foam is formed by a reaction between a polyol and diisocyanate. This reaction is highly exothermic. A complicating factor in the preparation of polyurethane foams is that certain of the foam forming reactions are reversible at high temperature.

Recently there has been an industry trend to move to lower density polyurethane foam. One result of this trend is that as the density of the foam decreases, the exotherm generated during the preparation of the foam increases, due to the high concentration of water needed to lower the density. Specifically it is the reaction of TDI and water that generates the largest exotherm during the polyurethane reaction.

One method that has been used to reduce this large exotherm is to use an auxiliary-blowing agent such as freon or methylene chloride. The addition of the auxiliary blowing agent reduces the amount of water needed to achieve the desired density and due to the lower amount of water, the exotherm is reduced.

Many auxiliary blowing agents that have been used in the past such as freons, hydrofluorcarbons and methylene chloride have come under attack recently for environmental reasons. The foam industry has since sought to prepare low density foams without the use of auxiliary blowing agents.

Forced air-cooling described in U.S. Pat. No. 5,171,756 incorporated herein by reference is one method that has been used by the foam industry to avoid the damage caused by the high exotherms of the polyurethane reaction. The method involves drawing cool air through the foam block.

Forced air cooling of polyurethane foam also has its own drawbacks of poor cure and loss of strength and integrity on the side of the bun that is closest to the exit for the airflow. One way the industry has tried to avoid this problem has been to wait a period of time before performing the forced air-cooling. However this allows a build up of heat due to the exotherm, which can also cause poor cure and loss of strength and integrity to the foam.

The use of flame retardants in polyurethane foam is well known. It has been observed that flame retarded foam is more sensitive to the waiting period required by forced air cooling and experiences a higher degree of poor cure and loss of strength and integrity than non-flame retarded foam.

One method of reducing the poor cure and loss of strength and integrity in flame retarded foam has been to use a flame retardant mixture based on brominated diphenylethers (optionally in combination with triaryl phosphates) mixed with an acid scavenger. The addition of the acid scavenger to the flame retardant mixture reduces the amount of poor cure and loss of strength and integrity caused by the forced air cooling.

The brominated diphenylether based flame retardants have come under attack recently for suspected environmental concerns. The foam industry has since sought to prepare foams without the use of brominated diphenylether based flame retardants.

What is needed is a means of preventing the poor cure and loss of strength and integrity of the flame retarded forced air-cooled foams without brominated diphenylether based flame retardants. The present invention addresses this need.

SUMMARY OF THE INVENTION

The invention relates to a flame retardant flexible polyurethane foam composition and a method of flame retarding flexible polyurethane foam. The composition comprises an otherwise flammable flexible polyurethane foam and a two component additive package comprising one or more flame retardants combined with an acid scavenger. The acid scavenger serves to neutralize acid that may be generated during processing of the foam to prevent poor cure and loss of strength and integrity of the foam.

DETAILED DESCRIPTION

Preferred aspects of the present invention relate to methods for improving the physical characteristics of polyurethanes. In particular, the present invention may use ring-brominated benzoates (i.e., bromobenzoate compounds, such as tetrabromobenzoate compounds) bromophthalate esters, hexabromocyclododecane, tribromoneopentyl alcohol, and/or dibromoneopentyl glycol as flame retardants in polyurethanes. Generally, the flame retardant compounds are incorporated directly into the polymer to provide the aforementioned beneficial properties.

Structures of compounds for use in the present invention include those encompassed by formula (I):

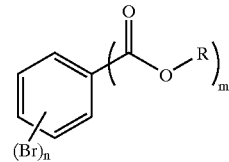

wherein n is an integer from 1 to 5, and R is an organic group having up to about 30 carbon atoms, and optionally being substituted with one or more groups such as alkoxy, halo, hydroxy, amino, thio, and the like, m is an integer from 1 to 2. In more preferred structures, n is an integer from 1 to 4, most preferably from 2 to 4, and m is an integer from 1 to 2 where if m is 2, then the ester substituents are adjacent on the benzene ring. m+n is not more than 6.

Desired bromobenzoates are preferably prepared by reacting bromophthalic anhydride with the appropriate alcohol in the presence of a decarboxylation catalyst. In one preferred embodiment the reaction is performed in an inert solvent to minimize the creation of phthalates.

Examples of bromobenzoates and phthalates which can be used in the present invention are those prepared from alcohols having a boiling point of between about 160. degree. C. and about 230. degree. C., preferably between 180. degree. C. and 205. degree. C. These alcohols provide the advantage of allowing the decarboxylation reaction used to prepare benzoates to proceed at a reasonable rate, while still allowing for ease of stripping the excess alcohol from the product at the end of the reaction. Preferably the alcohol is a non-halogenated, non-sulfur-containing, non-nitrogen-containing alcohol (and thus R will preferably be free from halogen, sulfur or nitrogen). Branched chain alcohols are most preferred. Suitable alcohols are listed in U.S. Pat. No. 5,728,760, incorporated herein by reference.

The total organic bromine content of the flame retardant is an important factor for efficiency as a flame retardant, and can be adjusted by the alcohol and/or solvent used in the synthesis and/or the catalyst loading and/or the number of bromines on the aromatic ring. The total organic, aromatically-bound bromine content of the flame retardant is useful within the range of 40–65%.

As an alternative to the above described brominated flame retardants, or in combination the above described brominated flame retardants there may be used phosphorous based flame retardants containing five percent (5%) or more phosphorous.

Compounds having less than about 5 wt. % phosphorus may also be useful, but it is believed that excessively high amounts of such compounds would be needed to provide the necessary level of flame retardancy. Included in the description of suitable phosphorus sources are the classes of phosphates, phosphonates, phosphinates, phosphites and phosphine oxides. These may contain various alkyl, aryl or alkyl aryl groups as long as the size of the groups does not dilute the phosphorus content below about 5 wt. %. They may be monomeric, dimeric, or oligomeric and may contribute between 0–100% of the blend.

A more preferred group of phosphorus-containing additives includes phosphates and phosphonates having either one or two phosphorus atoms per molecule includes:

Tricresyl phosphate, Trixylyl phosphatel, Butylated triphenyl phosphate, Isopropylated triphenyl phosphate, Triphenyl phosphate, Triethyl phosphate, Tris(2-ethylhexyl) phosphate, Dimethylpropyl phosphonate, Isodecyl diphenyl phosphate, Cresyl diphenyl phosphate, tri-n-butyl phosphate, tri-isobutyl phosphate, Tributoxyethyl phosphate, Resorcinol bis(diphenyl phosphate), Bisphenol A bis(diphenyl phosphate), 2,6,7-Trioxa-1-phosphabicyclo[2.2.2]octane-4-methanol, 1-oxide, and Diethyl ethyl phosphonate.

As will be appreciated by persons skilled in the art, the flame retardant compound is incorporated into thermoset polymers such as polyurethanes by including the flame retardant in the polyurethane mixture as the polymer is prepared. This process has been referred to as the "one-shot" technique, and is described with more particularity in common reference materials such as the Modern Plastics Encyclopedia, Vol. 71, No. 12 (1994), and was used in Examples 11 through 15 below.

As will be understood, the level of flame retardant incorporated into the polyurethane resin to provide an effective flame retarding amount will vary widely in accordance with many factors such as the particular resin used, the application contemplated, other additives present, etc. Typically, the flame retardant will be incorporated at levels between about 2% and 50% of the total system weight, and more commonly at levels between about 5% and 30% of the total system weight.

It will be understood that other conventional additives may also be incorporated into the polymer systems. For example, the flame retardant product can be incorporated along with antioxidants, antistatic agents, colorants, fibrous reinforcements, fillers, foaming/blowing agents, catalysts, heat stabilizers, impact modifiers, lubricants, plasticizers, processing aids, UV light stabilizers, crosslinking/curing agents, etc., without deviating from this invention.

In addition to the flame retardant components described, Applicants have found that the physical properties of flexible polyurethane foam may be materially enhanced by incorporation of one or more acid scavengers in the polyurethane. Useful acid scavengers are those that do not adversely inpact formation of polyurethane from the monomeric reactants of isocyanate and polyol. Examples of useful acid scavengers include hydroxides, carbonates, bicarbonates, amines, zeolites, hydrotalcites that will all adequately neutralize acid that may be generated during the polyurethane reaction. Some acid scavengers will adversely affect the polyurethane reaction to give material with poor physical properties; those are to be avoided. The more preferred acid scavenger is selected from the group of epoxides and diepoxides.

Epoxy acid scavengers are any materials bearing an epoxy functionality. Such materials are described in The Encyclopedia of Polymer Science and Engineering, $2^{nd}$ Edition, Vol. 6, pages 225–382. Given the number of materials that this discloses, and recognizing that the present invention has only recently been made, it can be appreciated that much needs to be done to identify preferred epoxy-bearing components. At this point it has been shown that a particular alicyclic material having a high epoxy function concentration performs well. (The number of epoxy groups relative to the size of the overall molecule is generally expressed as Epoxy Equivalent Weight (EEW), defined as the weight in grams of material which contains one gram equivalent of epoxide.) The identity of this preferred molecule is shown below:

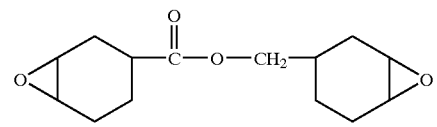

3',4'-epoxycyclohexylmethyl-3,4-epoxycyclohexanecarboxylate ERL-4221 as Sold by Union Carbide Corporation Similar molecules include:
3,4-epoxycyclohexyloxirane
2-(3',4'-epoxycyclohexyl)-5,1"-spiro-3",4"-epoxycyclohexane-1,3-dioxane
bis(3,4-epoxy-cyclohexylmethyl)adipate
cyclopentene oxide
cyclohexene oxide Besides the alicyclic epoxides, it is suggested that the simple aliphatic epoxies such as
propylene oxide
butylene oxide
hexylene oxide may also be desirable because of their low EEW and economy.

Epoxy acid scavengers are any materials bearing an epoxy functionality. Such materials are described in The Encyclopedia of Polymer Science and Engineering, $2^{nd}$ Edition, Vol. 6, pages 225–382. Given the number of materials that this discloses, and recognizing that the present invention has only recently been made, it can be appreciated that much needs to be done to identify preferred epoxy-bearing components. At this point it has been shown that a particular alicyclic material having a high epoxy function concentration performs well. (The number of epoxy groups relative to the size of the overall molecule is generally expressed as Epoxy Equivalent Weight (EEW), defined as the weight in grams of material which contains one gram equivalent of epoxide.) The identity of this preferred molecule is shown below:

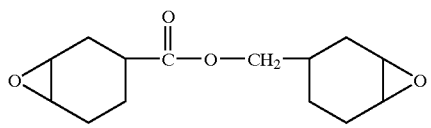

3',4'-epoxycyclohexylmethyl-3,4-epoxycyclohexanecarboxylate ERL-4221 as Sold by Union Carbide Corporation Similar molecules include:
  3,4-epoxycyclohexyloxirane
  2-(3',4'-epoxycyclohexyl)-5,1"-spiro-3",4"-epoxycyclohexane-1,3-dioxane
  bis(3,4-epoxy-cyclohexylmethyl)adipate
  cyclopentene oxide
  7-Oxabicyclo[4.1.0]heutane-3-carboxylic acid
  cyclohexene oxide Besides the alicyclic epoxides, it is suggested that the simple aliphatic epoxies such as
  propylene oxide
  butylene oxide
  hexylene oxide may also be desirable because of their low EEW and economy.

While not wishing to be limited, it is reasonable to consider that the preferred epoxy component would be a liquid which could be easily and conveniently be combined with the flame retardant to form a storage stable flame retardant package.

If the acid scavenger and flame retardant(s) were to be combined into a single package, it would typically contain from about 0.2–10 wt % of the acid scavenger, and preferably from about 1–4 wt %. The most preferred combination would have from about 1.5–2.5 wt % of the acid scavenger.

EXAMPLES

Foam samples were prepared by mixing the polyol and flame retardant blends. The remaining components of the formulations, except for the isocyanate, were added and stirred into the polyol/flame retardant mixture. The isocyanate was the last component added and stirred into the mixture.

The reaction mixture was poured into a 8×8×8" (20 cm×20 cm×20 cm) box and allowed to expand fully. The box containing the expanded foam was placed in a ventilated 120° C. oven for 10 minutes to accelerate curing. Foam samples were removed from the boxes. The top 1" of foam was removed as well as the Kraft paper lining the sides of the foam. The foam was then placed on a 8×8" (20 cm×20 cm) grate connected to a nominal 5.5 hp (11.4 ampere) shop vacuum. The foam sample remained on the vacuum setup for 20 min. at which time it was removed and friability of the foam was evaluated.

Example 1

1.8 Density Foam

TABLE 1

| | Example 1 | Comparative Ex. |
|---|---|---|
| Polyether Polyol (56.6 OH index)[a] | 100.0 parts by weight | 100.0 |
| Flame Retardant | 9* | 9 |
| Water | 3.5 | 3.5 |
| Amine Catalyst[b] | 0.50 | 0.50 |
| Silicone Surfactant[c] | 1.0 | 1.0 |
| Tin Catalyst[d] | 0.55 | 0.55 |
| TDI[e] | 47 | 47 |

[a] 56.6 hydroxyl number polyol prepared from polyethylene oxide having a molecular weight of 3000
[b] Dabco 826 amine catalyst, Air Products & Chemicals, 7201 Hamilton Boulevard, Allentown, PA 18195, United States
[c] Osi L-620 silicone surfactant, a polyalkalene oxide-methyl siloxane co-polymer. Crompton Corporation, One American Lane, Greenwich, CT 06831, United States
[d] stannous octoate catalyst
[e] toluene diisocyanate The flame retardant in Example 1 was a mixture of 49% 2-ethylhexyltetrabromobenzoate 49% an isopropylated triphenylphosphate 2% 3',4'-enoxycvclohexylmethyl 3,4-epoxycyclohexanecarboxylate also known as: 7-Oxabicyclo[4.1.0]heptane-3-carboxylic acid sold as ERL-4221 sold by Union Carbide Corporation.

The flame retardant in the Comparative example was a mixture of equal parts 2-ethylhexyltetrabromobenzoate and an isopropylated triphenylphosphate.

The physical properties of the cooled foam was evaluated. The comparative foam has lower tensile and tear strength in the bottom third of the foam bun. The decreased tensile and tear strength make the bottom third of the foam bun unusable. The entire bun is usable in the foam of Example 1.

Examples 2–5

1.2 Density Foam

In following Examples 2–5 the specified flame retardant blends were used to prepare flexible polyurethane foams. These foams were used to evaluate the effect of the flame retardant package on the physical properties of the resulting foam.

The formulations of the foam samples tested include the flame retardant blends listed together with, tolylene diisocyanate.

TABLE 2

| | Example 2 | Example 3 | Example 4 | Example 5 |
|---|---|---|---|---|
| Polyether Polyol (56.6 OH index)[a] | 100.0 parts | 100.0 | 100.0 | 100.0 |
| Flame Retardant | 21 | 21 | 21 | 21 |

TABLE 2-continued

| Water | 6.1 | 6.1 | 6.1 | 6.1 |
|---|---|---|---|---|
| Amine Catalyst[b] | 0.50 | 0.50 | 0.50 | 0.50 |
| Silicone Surfactant[c] | 1.0 | 1.0 | 1.0 | 1.0 |
| Tin Catalyst[d] | 0.26 | 0.26 | 0.26 | 0.26 |
| TDI (111 Index)[e] | 75.5 | 75.5 | 75.5 | 75.5 |
| Friability[f] | 5 | 2 | 4 | 1 |

Flame Retardants:
Example 2: (prior art) 49% 2-ethylhexyltetrabromobenzoate and 49% an isopropylated triphenylphosphate
Example 3: 49% 2-ethylhexyltetrabromobenzoate, 49% an isopropylated triphenylphosphate and 2% 3',4'-epoxycyclohexylmethyl 3,4-epoxycyclohexanecarboxylate also known as: 7-Oxabicyclo[4.1.0]heptane-3-carboxylic acid sold as ERL-4221 sold by Union Carbide Corporation.
Example 4: 49% Pentabromodiphenyl ether and 49% an isopropylated triphenylphosphate
Example 5: 49% Pentabromodiphenyl ether, 49% an isopropylated triphenylphosphate and 2% 7-Oxabicyclo[4.1.0]heptane-3-carboxylic acid sold as ERL-4221 sold by Union Carbide Corporation.
[a]56.6 hydroxyl number polyol prepared from polyethylene oxide having a molecular weight of 3000
[b]Dabco 826 amine catalyst Air Products & Chemicals, 7201 Hamilton Boulevard, Allentown, PA 18195 United States
[c]Osi L-620 silicone surfactant, a polyalkalene oxide-methyl siloxane co-polymer. Crompton Corporation, One American Lane, Greenwich, CT, 06831, United States
[d]stannous octoate catalyst
[e]toluene diisocyanate
[f]The friability was measured according to the following criteria:

| Rating | Criteria |
|---|---|
| 1 | Not Friable. (No crumbling of foam). |
| 2–3 | Slightly Friable. (Crumbling of foam, 1/16" of outer layer at most). |
| 4–5 | Moderately Friable. (Crumbling of foam, 1/8" of outer layer at most). |
| 5–6 | Friable (Crumbling of foam, 1/4" of outer layer at most). |
| 6–7 | Very Friable (Crumbling of foam, 1/2" of outer layer at most). |
| 8–9 | Extremely Friable. (Crumbling of foam, 1" of outer layer at most). |
| 10 | Completely Friable. (Crumbling of foam, anything over 1" of outer layer). |

In examples 2 and 4—when the acid scavenger is not present in the formulation—the resulting foam has lower tensile and tear strength as shown by the increased friability of the bun. The decreased tensile and tear strength and increased friability make the foam bun unusable. When the acid scavenger is present in the formulation the entire bun shows little to no friability and is usable.

Example 6

A flexible polyurethane is prepared according to Example 1 wherein the flame retardant is 2-ethylhexyltetrabromobenzoate 20.6 parts by weight and 3',4'-enoxycvclohexylmethyl 3,4-epoxycyclohexanecarboxylate also known as: 7-Oxabicyclo[4.1.0]heptane-3-carboxylic acid, 0.4 parts by weight. The resulting flexible polyurethane foam is entirely usable and free from scorch.

Example 7

A flexible polyurethane is prepared according to Example 1 wherein the flame retardant is isopropylated triphenylphosphate 20.6 parts by weight and 3',4'-epoxycyclohexylmethyl 3,4-epoxycyclohexanecarboxylate also known as: 7-Oxabicyclo[4.1.0]heptane-3-carboxylic acid, 0.4 parts by weight. The resulting flexible polyurethane foam is entirely usable and free from scorch.

What is claimed is:

1. A flexible polyurethane foam comprising a fire retardant consisting of a brominated composition, or a phosphorous composition, or both and 7-Oxabicyclo[4.1.0]heptane-3-carboxylic acid, also known by the name 3',4'-enoxycvclohexylmethyl 3,4-epoxycyclohexanecarboxylate, as an acid scavenger.

2. The flexible polyurethane foam composition according to claim 1 wherein the fire retardant is one or more components selected from the group consisting of tetrabromobenzoate esters, tetrabromophthalate esters, hexabromocyclododecane, tribromoneopentyl alcohol, dibromoneopentyl glycol, tricresyl phosphate, trixylyl phosphate, butylated triphenyl phosphate, isopropylated triphenyl phosphate, triphenyl phosphate, triethyl phosphate, tris(2-ethylhexyl), phosphate, dimethylpropyl phosphonate, isodecyl diphenyl phosphate, cresyl diphenyl phosphate, tri-n-butyl phosphate, tri-isobutyl phosphate, tributoxyethyl phosphate, resorcinol bis(diphenyl phosphate), bisphenol A bis(diphenyl phosphate), 2,6,7-trioxa-1-phosphabicyclo [2.2.2]octane-4-methanol, 1-oxide, and diethyl ethyl phosphonate.

3. The flexible polyurethane foam composition according to claim 1 wherein the flame retardant is a mixture of 2-ethylhexyltetrabromobenzoate and isopropylated triphenylphosphate.

4. A method of preparing a flame retarded flexible polyurethane foam composition comprising adding a flame retardant consisting of a brominated composition, or a phosphorous composition, or both and 7-Oxabicyclo[4.1.0]heptane-3-carboxylic acid, also known by the name 3',4'-enoxycyclohexylmethyl 3,4-epoxycyclohexanecarboxylate, as an acid scavenger.

5. The method of claim 4 wherein the flame retardant is selected from the group consisting of tetrabromobenzoate esters, tetrabromophthalate esters, hexabromocyclododecane, tribromoneopentyl alcohol, dibromoneopentyl glycol, tricresyl phosphate, trixylyl phosphate, butylated triphenyl phosphate, isopropylated triphenyl phosphate, triphenyl phosphate, triethyl phosphate, tris(2-ethylhexyl), phosphate, dimethyipropyl phosphonate, isodecyl diphenyl phosphate, cresyl diphenyl phosphate, tri-n-butyl phosphate, tri-isobutyl phosphate, tributoxyethyl phosphate, resorcinol bis (diphenyl phosphate), bisphenol A bis(diphenyl phosphate), 2,6,7-trioxa-1-phosphabicyclo[2.2.2]octane-4-methanol, 1-oxide, and diethyl ethyl phosphonate.

6. The method of claim 4 wherein the flame retardant is a mixture of 2-ethylhexyltetrabromobenzoate and isopropylated triphenyl phosphate.

* * * * *

UNITED STATES PATENT AND TRADEMARK OFFICE
CERTIFICATE OF CORRECTION

PATENT NO. : 7,008,973 B2  Page 1 of 1
APPLICATION NO. : 10/757685
DATED : March 7, 2006
INVENTOR(S) : Falloon et al.

It is certified that error appears in the above-identified patent and that said Letters Patent is hereby corrected as shown below:

Column 8,
Lines 15 and 41, delete "enoxycvclohexylmethyl" and replace with
-- epoxycyclohexylmethyl --.
Line 50, delete "dimethyipropyl" and replace with -- dimethylpropyl --.

Signed and Sealed this

Twentieth Day of June, 2006

JON W. DUDAS
*Director of the United States Patent and Trademark Office*